United States Patent [19]
Przybylski

[11] Patent Number: 4,719,018
[45] Date of Patent: Jan. 12, 1988

[54] AUTOMATIC WATER PURIFIER

[76] Inventor: Aleksander Przybylski, 5801 SW. 47 St., Miami, Fla. 33155

[21] Appl. No.: 647,876

[22] Filed: Sep. 6, 1984

Related U.S. Application Data

[63] Continuation-in-part of Ser. No. 581,266, Feb. 17, 1984, abandoned.

[51] Int. Cl.[4] .......................... C02F 1/48; C02F 1/50; C02F 1/78
[52] U.S. Cl. ........................ 210/748; 210/760; 210/143; 210/169; 210/243; 204/149; 204/305
[58] Field of Search .............. 210/662, 687, 739, 746, 210/748, 760, 96.1, 143, 169, 243; 204/149, 152, 191, 305

[56] References Cited

U.S. PATENT DOCUMENTS

| | | | |
|---|---|---|---|
| 3,351,542 | 11/1967 | Oldershaw | 210/169 |
| 3,378,479 | 4/1968 | Colvin | 210/169 |
| 3,592,212 | 7/1971 | Schleimer | 210/746 |
| 3,600,286 | 8/1971 | Sabins | 204/149 |
| 3,718,556 | 2/1973 | Rohrback | 204/149 |
| 3,785,954 | 1/1974 | Herbert | 204/149 |
| 3,799,344 | 3/1974 | Nishizawa | 210/96.1 |
| 3,843,507 | 10/1974 | Kwan | 204/149 |
| 4,016,079 | 4/1977 | Severin | 210/96.1 |
| 4,224,154 | 9/1980 | Steininger | 210/96.1 |
| 4,236,992 | 12/1980 | Themy | 204/149 |
| 4,263,114 | 4/1981 | Shindell | 204/149 |
| 4,275,448 | 6/1981 | Le Dall | 210/662 |
| 4,299,698 | 11/1981 | Rak | 210/96.1 |
| 4,337,136 | 6/1982 | Dahlgren | 210/169 |
| 4,351,734 | 9/1982 | Kaufman | 210/760 |
| 4,357,143 | 11/1982 | Scott | 210/662 |
| 4,384,943 | 5/1983 | Stoner | 204/149 |
| 4,436,601 | 3/1984 | Brunchick | 204/149 |
| 4,492,618 | 6/1985 | Eder | 210/169 |
| 4,517,084 | 5/1985 | Pincon | 210/169 |
| 4,525,253 | 6/1985 | Hayes | 204/149 |

Primary Examiner—Ernest G. Therkorn

[57] ABSTRACT

Fully automatic electronic device of water purifier is described which, delivering low and higher frequency square wave electrical impulses and metal ions as well as producing ozone, disrupts the membrane and deplets intracellular ions from the algae, amebae, fungi and bacteria and stops metabolic processes within said organisms.

2 Claims, 2 Drawing Figures

AUTOMATIC WATER PURIFIER

This is a continuation-in-part of application Ser. No. 581,266 filed Feb. 17, 1984, now abandoned.

BACKGROUND OF THE INVENTION

1. Field of the Invention

The invention relates to water purifiers, and in particular, it comprises a method and an electronic device for water purification while flowing and in an open cointainers.

2. Prior Art

Choosing of the method of water purification depends on the level of impurity and the required degree of purification. Therefore various methods used in the process of water purification have some advantages and disadvantages. Beyond mechanical (e.g. U.S. Pat. No. 4,412,919) and electrochemical (e.g. U.S. Pat. No. 4,382,866) methods, predominantly chemical means of water purification such as chlorination and fluorination are in practice.

In the case of chemical conditioning of water by simple adding of chlorine or by means of a respective delivering device (U.S. Pat. Nos. 3,600,286; 4,236,922; 4,248,681; 4,381,240), the presence of chlorine precludes biological purification of water (e.g. U.S. Pat. No. 4,415,450). Therefore, attempts were made to avoid this limitation. Electric current, in the form of square impulses with reversion of polarity by using an electromagnetic relay, has been proposed. However, the polarity reversal of impulses was relative to the same referece electrode (U.S. Pat. Nos. 3,600,286; 3,785,954). The subsequently alternating reversal of the polarity of electric impulses, relative to one electrode, is still in the art although the electromagnetic relay was changed for electronic switching (U.S. Pat. Nos. 3,843,507; 4,263,114; 4,384,943). The efficiency of the devices in such cases is diminished in time because deposition of materials inhibiting the process on the electrodes and because of uneven use of the electrodes.

Up to date methods of water purification are based on electrolysis and production of chlorine or other chemically active compounds (U.S. Pat. Nos. 4,236,992; 4,263,114; 4,384,943).

The proposed method is based on disintegration of the membrane and inhibition of metabolic processes within the organism by delivering resonant frequency electric field and low frequency electrical square impulses of opposite polarity.

SUMMARY OF THE INVENTION

Several factors contribute to the operation of the device: electromagnetic field of the resonant frequency, electric current, presence of metal ions such as copper and silver, ozone and traces of chlorine (if added). The electromagnetic field disrupts the cell membrane. The alternative action of the current between electrodes depletes the intracellular cations and anions. The copper and silver ions act as an inhibitor of enzymes within algae, amebae, fungi and bacteria cells. As of result, the destruction of the membrane integrity of the above mentioned organisms and stopping the metabolic processes within them take place. Ozone produced by the device results in the biocidic effect.

The below described device of the water purifier is an electronic arrangement which delivers electromagnetic field and square electrical impulses across the electrodes immersed in water, as well as produces ozone which is trapped with the air to water.

The device is assembled of solid state elements, and does not contain any movable parts such as, for instance, relays. It is powered by AC or DC current. The output voltage and current of the device is set up according to planned efficiency of the device and safety requirements.

The below features distinguish the proposed method and device for water purification from others described in the patent literature:

1. The low frequency electric current impulses are modified by a resonant electric field around 2 KHz.
2. Not alternating and relative to one electrode, but simultaneously opposed polarity square waves are delivered to electrodes.
3. The device can be powered either by AC or DC current (e.g. from solar batteries).
4. Low frequency impulses are set by frequency divider in the case when the device is powered by AC 60 Hz, or by a timer in the case if it is powered by DC current source.
5. Ozone is produced simultaneously by and during delivering current impulses.
6. Electrodes are made of copper-silver alloy, stainless steel, graphite, or other material.
7. Traces of salts are present in water.

The proposed method has the following advantages:

1. Increased efficiency of destruction of organisms in water.
2. Higher effective voltage and current between electrodes due to the fact that equal and opposite polarity impulses are applied simultaneously.
3. Higher safety factor due to the fact that there is absent a third (reference) or ground electrode in the water container.
4. Higher safety factor of the device as compared to some devices (e.g. U.S. Pat. No. 4,236,992) because the presence of one or two transformers, which provide AC line isolation.
5. Simultaneous production of ozone by current impulses lowers the operating cost.
6. A slight increase of $p^H$, due to the electrolytic process taking place on electrodes, is compensated by the $p^H$ decrease because of dissolved $CO_2$ from the air (and increased acidity caused by users of the pool).

The proposed method is described using an example of swimming pool water purification. The proposed method and the respective device are illustrated below. However, the applications are much broader than in the above example.

The device is composed of its main control parts as well as of additional units. The main part consists of transformer (if powered by AC source or DC/AC converter if powered by DC one), high-voltage transformer and spark plugs. The control unit consists of: frequency divider, two coupled operational amplifier, two pairs of transistors, working in a push-pull mode, two pairs of coupled power switching transistors and of 2kHz oscillator of square waves.

An additional control unit consist of a timer, amplifier, and switch (common elements) and: photo-electrocolory-metric sensor, comparator, amplifier and switch as a constructive elements of the water purity indicator, as well as of $p^H$-sensor, comparator, amplifier and light emiting diode as constituent elements of the $p^H$-indicator.

The operation of the device will be apparent from the following drawings and more particular description of a preferred embodiment.

DESCRIPTION OF THE PREFERRED EMBODIMENT

Figure 1:
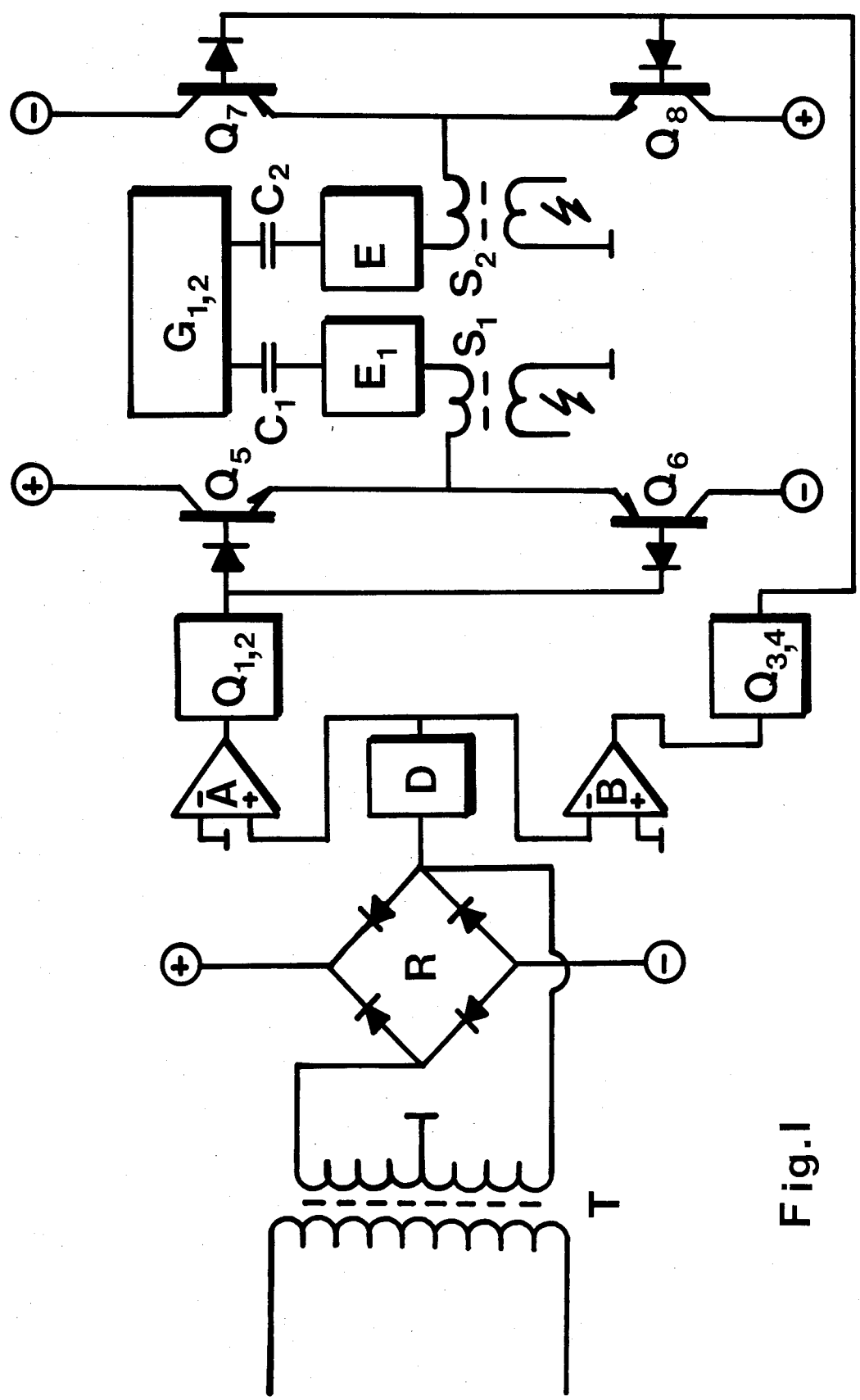
FIG. 1. Schematic drawing of the device comprising the power source and the impulse setup.
Figure 2:
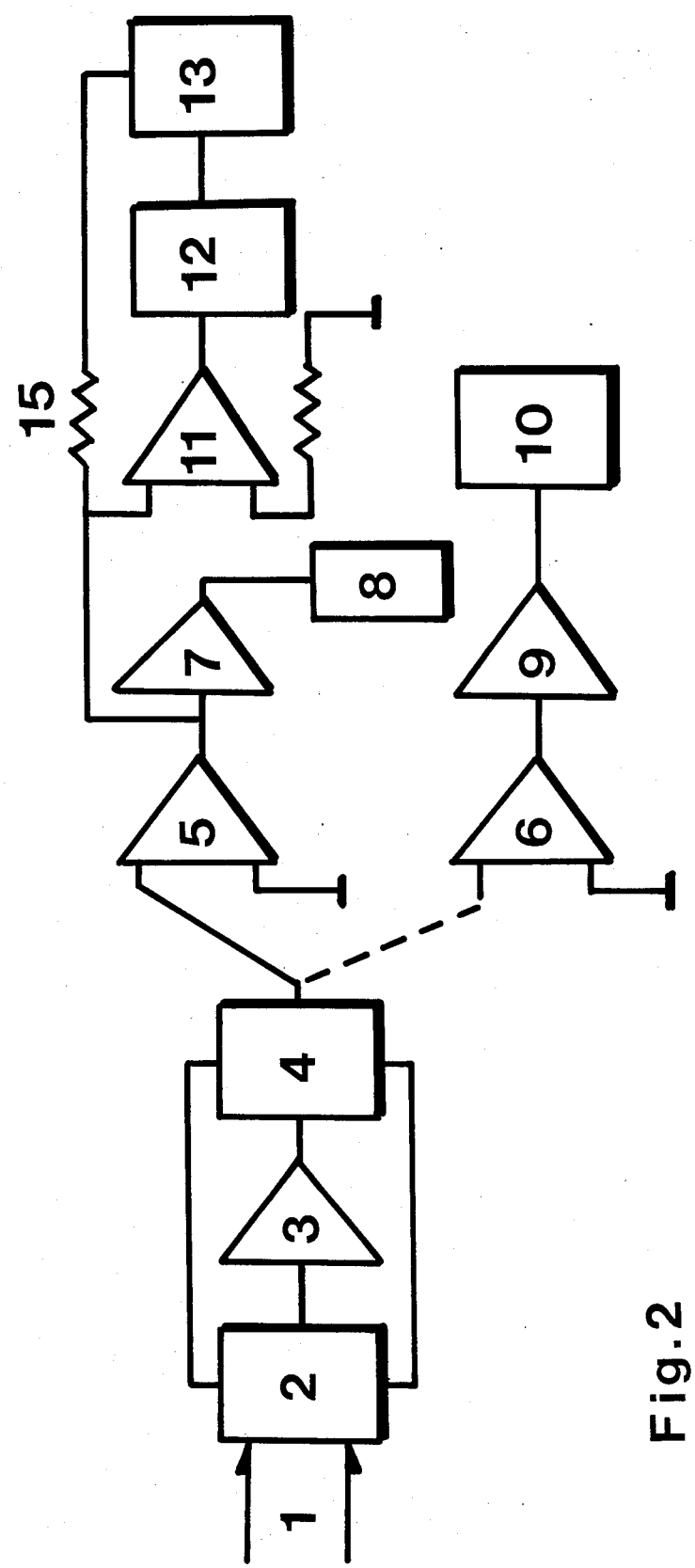
FIG. 2. The control arrangement of the device comprising the purifier indicator, indicator and deionizing chamber on-off switch.

In the preferred embodiment of the purifier, the device is powered by an AC source. The supply voltage is obtained from the secondary winding of the power transformer T and rectified by the rectifier R. Control impulses delivered by power transformer T are divided by divider D. Then are fed to two, A and B, coupled operational amplifiers which generate square impulses of opposite polarity. These impulses control a set of two pairs of PNP-NPN $Q_{1-2}$ and $Q_{3-4}$ control transistors. They work in such a way that if the push-pull pair of transistors is generating a positive impulse during the first half of cycle, the second pair of transistors is generating a negative impulse. During the second half of the cycle of AC current these pairs of transistors generate opposite polarity square impulses. These impulses are fed through diodes 1-2 and 3-4 to the two pairs power $Q_{5-6}$ and $Q_{7-8}$ switching transistors generating simultaneously square waves of opposite polarity. These are delivered, through the primary windings of $S_1$ and $S_2$ of the high-voltage transformer, to $E_1$ and $E_2$ electrodes. The secondary windings of the high-voltage transformer are connected to a spark plug, at which change of current impulse results in a spark producing ozone. Ozone is delivered with a stream of air to the water.

Two square wave generators $G_{1-2}$ operating at about 2kHz, controlled by a coupled pair of operational amplifier, modulate the low frequency square impulses. The higher frequency impulses pass through capacitors $C_1$ and $C_2$.

The two additional control units opperate as follows: The pH-electrode and the photo-electro-colorimetric (phototransistor) impulses from sensors 1 respectively, passing through timer 2, are amplified by the operational amplifier 3. The switch 4, controlled by the timer 2, alternatively selects the water-purity-indicator comparator 5 or the pH-indicator comparator 6, respectively. The output signals of the comparator 5 signal the difference in water purity. The difference is amplified by an operational amplifier 7 and fed to the on-off switch 8 of the water purifier.

The output signals of the comparator 6 detect the difference in pH of water, and through amplifier 9 and by means of a light emitting diode indicate the difference of pH from a preset level.

The proper, preselected degree of water purity is maintained by duration of operation of the water purifier device.

For removal of ions from water before its immediate use for various purposes (among others as a potable water), a deionization device is provided. A high degree of water purification, where not only the constant level of ions is maintained, but also the removal of deposited ions is solved by using an ion exchange method (e.g. U.S. Pat. Nos. 4,383,924; 4,400,278; 4,409,084; 4,412,922; 4,412,923) or any ion retention means (e.g. U.S. Pat. Nos. 4,378,293; 4,389,311; 4,392,959). The control device comprises a comparator 11, switch 12 and deionization chamber or ion exchange column 13. The required level of ions in water is controlled by a comparator 11 through setting resistor 14 and feedback resistor 15. If the required level of ions leaving the water purifier exceeds the preset level, the output signal from the comparator 11 activate switch 12 and switch on the dionizing device.

I claim:

1. An apparatus for purifying water by supplying low frequency square waves and higher frequency square waves of mutually opposed polarity and ozone to the water comprising:
    electrodes;
    means for supplying water between said electrodes;
    an AC or a DC power source with its respective converter;
    means for supplying power to control means; said control means comprising a frequency divider, two coupled operational amplifiers, two pairs of transistors working in a push-pull mode, two pairs of coupled power switching transistors and of about 2 kHz oscillators of square waves connected in such a manner as to produce and simultaneously apply square wave impulses of a low frequency and a higher frequency to the electrodes;
    means to produce spark; means to connect said means to produce spark to said impulses in such a manner as to supply a spark to a stream of air to produce ozone; and
    means to deliver the stream of air and the produced ozone to the water.

2. A method of purifying water comprising:
    treating the water with low frequency square waves and simultaneously higher frequency square waves of mutually opposed polarity and ozone produced from an apparatus comprising
    electrodes;
    means for supplying water between said electrodes;
    an AC or a DC power source with its respective converter;
    means for supplying power to control means; said control means comprising a frequency divider, two coupled operational amplifiers, two pairs of coupled power switching transistors and of about 2 kHz oscillators of square waves connected in such a manner as to produce and simultaneously apply square wave impulses of a low frequency and a higher frequency to the electrodes;
    means to produce spark;
    means to connect said means to produce spark to said impulses in such a manner as to supply a spark to a stream of air to produce ozone; and
    means to deliver the stream of air and the produced ozone to the water.

* * * * *